July 27, 1965    F. N. RUSHTON    3,196,763
PANEL STRUCTURE
Filed Oct. 5, 1960

FREDERICK N. RUSHTON
INVENTOR

BY Walter G. Finch
ATTORNEY

United States Patent Office 3,196,763
Patented July 27, 1965

1

3,196,763
PANEL STRUCTURE
Frederick N. Rushton, Baltimore, Md., assignor to Washington Aluminum Company, Inc., Baltimore, Md., a corporation of Maryland
Filed Oct. 5, 1960, Ser. No. 60,642
2 Claims. (Cl. 94—11)

This invention relates generally to metallic building structural devices, and more particularly it pertains to reinforced metal floor plates.

Fabricated structural panelling in the past has generally lacked strength at least in one direction. For example, metal floor plates with the usual reinforcing structure consisting of longitudinal ribs or lengthwise undulating or corrugated sheet tend to bend as a unit on a line parallel to such ribs or corrugations. This has been corrected by using a third ply or bottom sheet.

Various intervening structure, such as honeycomb and dimples has been used to stiffen the panel with admittedly successful results. This practice is wasteful of material and results in an unduly heavy panel, and it is to be noted, a generally stiff, dead, slab-like floor which is very hard on the feet.

A small amount of localized resiliency or "give" of the panel is desirable as anyone can testify after standing for equal periods on a plain metal deck and particularly one sheathed with wood. While the application of wood or rubber tread usually gives relief, such materials are not durable in the presence of oil, heat, strong sunlight and in rough service.

It, therefore, is a basic object of the present invention to provide an all-metal, two-ply conically reinforced structural panel of great strength having a resilient non-skid surface.

Another object of this invention is to provide a reinforcing sheet structure for easy spot-weld assembly to a longitudinally serrated or unserrated tread plate.

And another object of this invention is to provide a flanged, pan-trussed floor panel having great unitized rigidity and yet localized resilience to foot contact.

These and other objects and attendant advantages of this invention will become more readily apparent and understood from the accompanying specification and single sheet of drawings in which.

Figure 1:
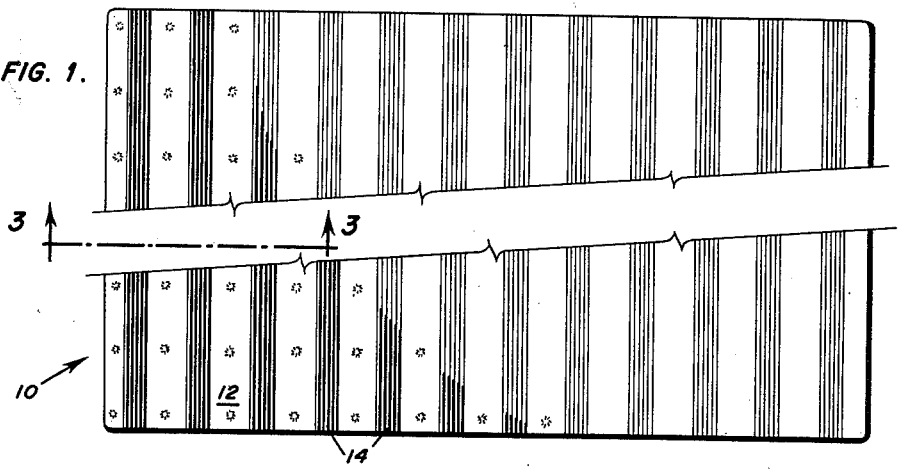
FIG. 1 is a lengthwise, shortened top plan view, of a panel structure incorporating features of this invention.
Figure 2:
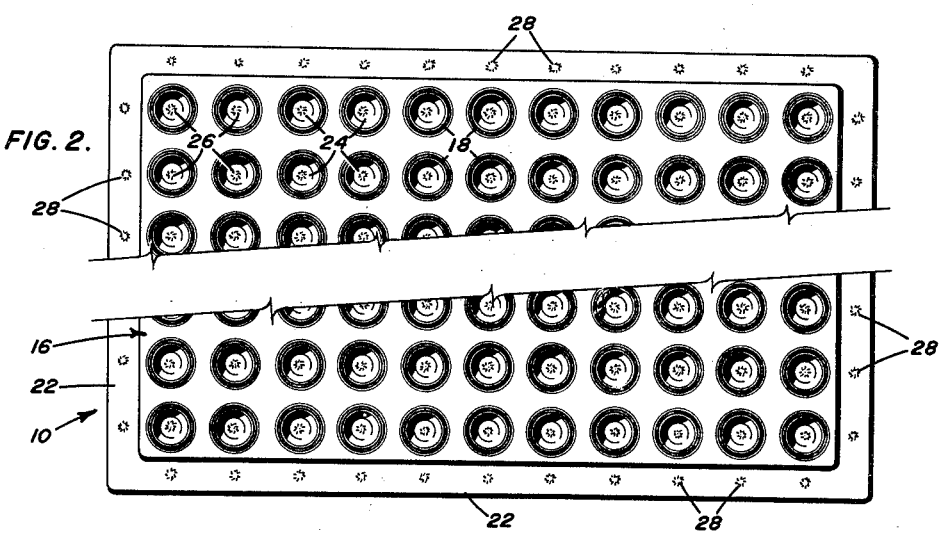
FIG. 2 is a view similar to FIG. 1 except viewed from the bottom thereof.
Figure 3:
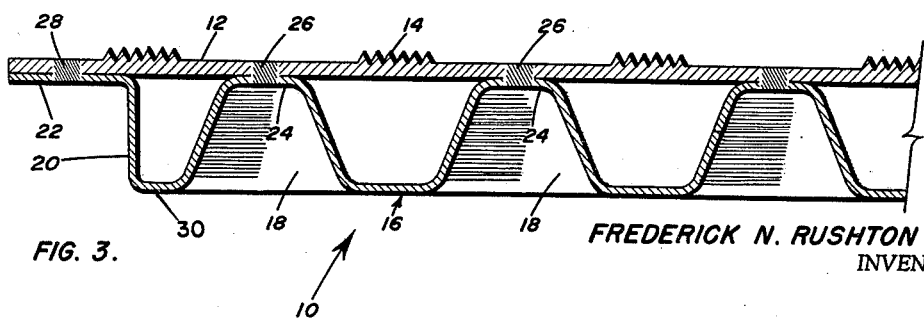
FIG. 3 is an enlarged cross-section taken in the direction of the arrows and along the line 3—3 of FIG. 1.

Referring now to the detailed drawings of FIGS. 1, 2, and 3, there is shown a structural tile or panel incorporating features of this invention which is indicated generally therein by reference numeral 10. The panel 10 is fabricated from two pieces, a top or tread plate 12, and a lower structural dimpled member or pan 16. The top or tread plate 12 is formed with a non-skid surface consisting of a plurality of parallel, spaced, rows of upstanding serrated areas 14. Each row of each serrated area 14 consists of a plurality of closely spaced substantially parallel inverted V-shaped ridges extending from one edge of the panel 10 to its opposite edge, with the top edges of the ridges terminating with the same horizontal plane above the surface of the tread 10.

The lower member or pan 16, as shown best in FIGS. 2 and 3, is formed with a plurality of spaced rows of

2 inverted cups or pedestals 18, and with a peripheral vertical flange 20 and a peripheral horizontal flange 22 as a continuation of said vertical flange. The inverted cups or pedestals 18 are preferably of conical shape. This horizontal flange 22 is secured to the periphery of the tread plate 12 by means of spaced spot welds 28.

The rows of cups or pedestals 18 are alternately located with respect to the rows of serrated areas 14 so that spot welds 26 made inside the cup bottoms 24 of the pedestals 18 to the tread plate 12 occur between the rows of serrated areas 14.

Thus, it is to be noted that a unitized two-ply structure results which has a lower web 30 consisting of the metal forming the rims of the pedestals 18 and the tread 12 securely spaced apart.

Further, it is to be pointed out that the lines of rigid support points, namely the spot welds 26, lie between the rows of serrated areas 14 and thus are not contacted by the foot when walked thereupon. With no support underlying the rows of serrated tread 14, pressure thereon results in a slight localized give or resilience whereas the structural panel 10 as a whole remains rigid.

It is to be pointed out that, if desired, the top surface of the plate 10 can be made flat, that is, the rows of serrated areas 14 can be omitted, and, tile blocks can be positioned thereon to give a smooth surface, where it is desired to use the panel 10 for support of electronic computer equipment.

It is also to be pointed out that the panels 10 can be joined together by conventional means, or can be supported by pedestal mounts at their corners.

Obviously many modifications and variations of the present invention are possible in light of the above teachings. It is, therefore, to be understood that within the scope of the appended claims, the invention may be practiced otherwise than as specifically described.

What is claimed is:

1. A resilient structural floor panel, comprising a truss pan of substantially rectangular shape having a web, said web including a continuous first flange integral with said pan and positioned substantially vertically around the periphery of said pan and a second flange as a continuation of said first flange extending horizontally therefrom, said pan having parallel spaced rows of right frusto-conical shaped cup pedestals having their bottoms flat and terminating in a common plane with said second horizontal flange, said spaced rows of cup pedestals extending across said pan and being arranged parallel and perpendicular to opposite pairs of sides, respectively, of said truss pan, a tread plate covering said pan and web arranged coextensively with said second flange of said web, said tread plate thereby having a margin around the periphery thereof consisting essentially of the thicknesses of the tread plate and the second flange of said web, said tread plate having spaced rows of serrated areas alternating and being located parallel to said spaced rows of cup pedestals, means integrally joining the periphery of said tread plate and second flange of said web together at spaced intervals, means for integrally joining the bottoms of said cup pedestals to said treadplate, whereby a unitized rigid floor panel with localized resilient foot contact portions at the spaced rows of serrated areas between said spaced rows of pedestals is obtained.

2. The resilient structural floor panel of claim 1, wherein said means integrally joining the periphery of said tread plate and second flange of said web together at spaced intervals and the bottoms of said cup pedestals to said tread plate are spot weld means.

References Cited by the Examiner

UNITED STATES PATENTS

| | | | |
|---|---|---|---|
| 1,782,234 | 11/30 | Hofmann | 189—34 |
| 1,784,511 | 12/30 | Carns | 189—34 |
| 1,921,822 | 8/33 | Hines | 94—4 |
| 2,138,927 | 12/38 | Keller | 189—34 |
| 2,142,640 | 1/39 | Focht | 189—34 |
| 2,481,046 | 9/49 | Scurlock | 189—34 |
| 2,742,121 | 4/56 | Liskey | 94—5 |
| 3,011,602 | 12/61 | Ensrud et al. | 189—34 |

JACOB L. NACKENOFF, *Primary Examiner.*